(12) United States Patent
Chane et al.

(10) Patent No.: US 11,388,451 B2
(45) Date of Patent: Jul. 12, 2022

(54) METHOD AND SYSTEM FOR ENABLING DATA-RICH INTERACTIVE TELEVISION USING BROADCAST DATABASE

(75) Inventors: Lena D. Chane, San Francisco, CA (US); David Brandyberry, San Rafael, CA (US); Alex Chung, San Francisco, CA (US); Ali Crakes, Novato, CA (US); Sithampara Babu Niranjan, Larkspur, CA (US); Viva Chu, San Leandro, CA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

(21) Appl. No.: 10/306,752

(22) Filed: Nov. 27, 2002

(65) Prior Publication Data
US 2004/0024753 A1 Feb. 5, 2004

Related U.S. Application Data

(60) Provisional application No. 60/333,961, filed on Nov. 27, 2001, provisional application No. 60/353,799, filed on Jan. 30, 2002.

(51) Int. Cl.
*G06F 7/00* (2006.01)
*H04N 21/231* (2011.01)
(Continued)

(52) U.S. Cl.
CPC . *H04N 21/23109* (2013.01); *H04N 21/23617* (2013.01); *H04N 21/4349* (2013.01); *H04N 21/4828* (2013.01); *H04H 20/16* (2013.01)

(58) Field of Classification Search
CPC ......... H04N 21/4438; H04N 21/47202; H04N 21/478; H04N 21/4786; H04N 21/4788;
(Continued)

(56) References Cited

U.S. PATENT DOCUMENTS 5,287,489 A 2/1994 Nimmo et al.
5,321,750 A 6/1994 Nadan
(Continued)

FOREIGN PATENT DOCUMENTS

EP 0624039 11/1994
EP 0624039 A2 11/1994
(Continued)

OTHER PUBLICATIONS

Andreas Kraft and Klaus Hofrichter, "An Approach for Script-Based Broadcast Application Production", Springer-Verlag Brling Heidelberg, pp. 74-82, 1999.
(Continued)

*Primary Examiner* — Mohammad A Sana
(74) *Attorney, Agent, or Firm* — Banner & Witcoff, Ltd.

(57) ABSTRACT

A database is packed up for broadcast over an iTV system by packaging, compressing, and streaming the database via one or more carousels. The packing up process creates one or more data modules, each including record sets, and one or more modules containing computer-readable instructions for resolving queries using the record sets. These modules, along with a table of contents module that includes descriptions of how the data modules are composed and interfaces to the modules containing the computer-readable instructions, are downloaded at a set top box in order to resolve queries from television users and/or other applications. Thereafter, the computer-readable instructions are executed to resolve the queries. When available, the results produced by executing the query may be displayed on a television. Information regarding the queries may be used to modify the packing up and/or broadcast processes.

56 Claims, 5 Drawing Sheets

(51) Int. Cl.
*H04N 21/236* (2011.01)
*H04N 21/482* (2011.01)
*H04N 21/434* (2011.01)
*H04H 20/16* (2008.01)

(58) Field of Classification Search
CPC ............. H04N 21/482; H04N 21/4828; H04N 21/812; H04N 21/8543; H04N 21/8545; H04N 5/44543; H04N 5/45; H04N 21/4437; H04N 21/4532; H04N 21/4622; H04N 21/47214; H04N 21/4782; H04N 7/165; H04N 7/17318; H04N 21/23617; H04N 21/25841; H04N 21/25891; H04N 21/2668; H04N 21/4349; H04N 21/44222; H04N 21/472; H04N 21/4781; H04N 21/488; H04N 21/6582; H04N 21/23109; H04H 20/16; G06Q 30/02; F02B 61/045; F02B 2075/025; F02B 2075/125; F02B 2075/1812; F02B 75/20; G01S 11/02; G01S 11/16; G01S 5/0221; G02F 1/133512; G02F 1/133514; G02F 1/134363; G02F 2001/134372; G02F 2001/134381; G02F 2201/128; Y02T 10/123; H04H 20/16; G06F 16/24578; G06F 16/248; G06F 16/40; G06F 16/739; H01L 2924/0002; H01L 2924/00; H01L 23/58; H01L 2924/3011

USPC .................................................. 707/690–695
See application file for complete search history.

(56) References Cited

U.S. PATENT DOCUMENTS

| | | | |
|---|---|---|---|
| 5,353,121 A | 10/1994 | Young et al. | |
| 5,485,221 A | 1/1996 | Banker et al. | |
| 5,530,939 A * | 6/1996 | Mansfield, Jr. | G06F 16/28 |
| 5,583,563 A | 12/1996 | Wanderscheid et al. | |
| 5,589,892 A | 12/1996 | Knee et al. | |
| 5,592,551 A | 1/1997 | Lett et al. | |
| 5,594,509 A | 1/1997 | Florin et al. | |
| 5,613,057 A | 3/1997 | Caravel | |
| 5,621,456 A | 4/1997 | Florin et al. | |
| 5,657,072 A | 8/1997 | Aristides et al. | |
| 5,659,793 A | 8/1997 | Escobar et al. | |
| 5,666,645 A | 9/1997 | Thomas et al. | |
| 5,675,752 A | 10/1997 | Scott et al. | |
| 5,694,176 A | 12/1997 | Bruette et al. | |
| 5,802,284 A | 9/1998 | Karlton et al. | |
| 5,826,102 A | 10/1998 | Escobar et al. | |
| 5,844,620 A | 12/1998 | Coleman et al. | |
| 5,850,218 A | 12/1998 | LaJoie et al. | |
| 5,852,435 A | 12/1998 | Vigneaux et al. | |
| 5,860,073 A | 1/1999 | Ferrel et al. | |
| 5,883,677 A | 3/1999 | Hofmann | |
| 5,892,902 A | 4/1999 | Clark | |
| 5,892,905 A | 4/1999 | Brandt et al. | |
| 5,905,492 A | 5/1999 | Straub et al. | |
| 5,929,849 A | 7/1999 | Kikinis | |
| 5,945,987 A * | 8/1999 | Dunn | H04N 7/17318 348/E7.071 |
| 5,960,194 A * | 9/1999 | Choy | G06F 9/355 |
| 5,990,890 A | 11/1999 | Etheredge | |
| 5,996,025 A | 11/1999 | Day et al. | |
| 6,002,394 A * | 12/1999 | Schein | H04N 5/44543 348/E5.104 |
| 6,005,561 A | 12/1999 | Hawkins et al. | |
| 6,008,803 A | 12/1999 | Rowe et al. | |
| 6,008,836 A | 12/1999 | Bruck et al. | |
| 6,016,144 A | 1/2000 | Blonstein et al. | |
| 6,025,837 A | 2/2000 | Matthews, III et al. | |
| 6,049,823 A * | 4/2000 | Hwang | 725/82 |
| 6,061,695 A | 5/2000 | Slivka et al. | |
| 6,067,108 A | 5/2000 | Yokote et al. | |
| 6,088,722 A | 7/2000 | Herz et al. | |
| 6,091,411 A | 7/2000 | Straub et al. | |
| 6,094,237 A | 7/2000 | Hashimoto | |
| 6,141,003 A | 10/2000 | Chor et al. | |
| 6,148,081 A * | 11/2000 | Szymanski | H04N 7/163 348/E5.006 |
| 6,162,697 A | 12/2000 | Singh et al. | |
| 6,169,543 B1 | 1/2001 | Wehmeyer | |
| 6,172,677 B1 | 1/2001 | Stautner et al. | |
| 6,177,931 B1 | 1/2001 | Alexander et al. | |
| 6,191,781 B1 | 2/2001 | Chaney et al. | |
| 6,195,692 B1 | 2/2001 | Hsu | |
| 6,205,582 B1 * | 3/2001 | Hoarty | 725/93 |
| 6,219,839 B1 | 4/2001 | Sampsell | |
| 6,239,795 B1 | 5/2001 | Ulrich et al. | |
| 6,240,555 B1 | 5/2001 | Shoff et al. | |
| 6,281,940 B1 | 8/2001 | Sciammarella | |
| 6,292,187 B1 | 9/2001 | Gibbs et al. | |
| 6,292,827 B1 | 9/2001 | Raz | |
| 6,295,057 B1 | 9/2001 | Rosin et al. | |
| 6,314,569 B1 | 11/2001 | Chernock et al. | |
| 6,317,885 B1 | 11/2001 | Fries | |
| 6,345,305 B1 | 2/2002 | Beck et al. | |
| 6,405,239 B1 | 6/2002 | Addington et al. | |
| 6,415,438 B1 | 7/2002 | Blackketter et al. | |
| 6,421,067 B1 | 7/2002 | Kamen et al. | |
| 6,426,779 B1 | 7/2002 | Noguchi et al. | |
| 6,442,755 B1 | 8/2002 | Lemmons et al. | |
| 6,477,705 B1 | 11/2002 | Yuen et al. | |
| 6,486,920 B2 | 11/2002 | Arai et al. | |
| 6,522,342 B1 | 2/2003 | Gagnon et al. | |
| 6,529,950 B1 | 3/2003 | Lumelsky et al. | |
| 6,530,082 B1 | 3/2003 | Del Sesto et al. | |
| 6,532,589 B1 | 3/2003 | Proehl et al. | |
| 6,564,263 B1 | 5/2003 | Bergman et al. | |
| 6,567,104 B1 | 5/2003 | Andrew et al. | |
| 6,571,392 B1 | 5/2003 | Zigmond et al. | |
| 6,591,292 B1 | 7/2003 | Morrison et al. | |
| 6,621,509 B1 | 9/2003 | Eiref et al. | |
| 6,636,887 B1 | 10/2003 | Augeri | |
| 6,658,661 B1 | 12/2003 | Arsenault et al. | |
| 6,678,891 B1 | 1/2004 | Wilcox et al. | |
| 6,684,400 B1 | 1/2004 | Goode et al. | |
| 6,694,312 B2 * | 2/2004 | Kobayashi | G06F 16/2291 |
| 6,704,359 B1 | 3/2004 | Bayrakeri et al. | |
| 6,731,310 B2 | 5/2004 | Craycroft et al. | |
| 6,745,367 B1 | 6/2004 | Bates et al. | |
| 6,760,043 B2 | 7/2004 | Markel | |
| 6,763,522 B1 | 7/2004 | Kondo et al. | |
| 6,766,526 B1 | 7/2004 | Ellis | |
| 6,806,887 B2 | 10/2004 | Chernock et al. | |
| 6,857,128 B1 | 2/2005 | Borden, IV et al. | |
| 6,886,029 B1 | 4/2005 | Pecus et al. | |
| 6,904,610 B1 | 6/2005 | Bayrakeri et al. | |
| 6,910,191 B2 | 6/2005 | Segerberg et al. | |
| 6,918,131 B1 | 7/2005 | Rautila et al. | |
| 6,963,880 B1 | 11/2005 | Pingte et al. | |
| 7,028,327 B1 | 4/2006 | Dougherty et al. | |
| 7,065,785 B1 | 6/2006 | Shaffer et al. | |
| 7,080,400 B1 * | 7/2006 | Navar | H04N 7/17336 348/E7.073 |
| 7,103,904 B1 | 9/2006 | Blackketter et al. | |
| 7,114,170 B2 | 9/2006 | Harris et al. | |
| 7,134,072 B1 | 11/2006 | Lovett et al. | |
| 7,152,236 B1 | 12/2006 | Wugofski et al. | |
| 7,162,694 B2 | 1/2007 | Venolia | |
| 7,162,697 B2 | 1/2007 | Markel | |
| 7,174,512 B2 | 2/2007 | Martin et al. | |
| 7,197,715 B1 | 3/2007 | Valeria | |
| 7,207,057 B1 | 4/2007 | Rowe | |
| 7,213,005 B2 * | 5/2007 | Mourad et al. | 705/64 |
| 7,221,801 B2 | 5/2007 | Jang et al. | |
| 7,237,252 B2 | 6/2007 | Billmaier | |
| 7,305,696 B2 | 12/2007 | Thomas et al. | |
| 7,337,457 B2 | 2/2008 | Pack et al. | |
| 7,360,232 B2 | 4/2008 | Mitchell | |
| 7,363,612 B2 | 4/2008 | Satuloori et al. | |

(56) References Cited

U.S. PATENT DOCUMENTS

| | | | |
|---|---|---|---|
| 7,406,705 B2 * | 7/2008 | Crinon | H04N 7/16 348/E7.054 |
| 7,440,967 B2 | 10/2008 | Chidlovskii | |
| 7,464,344 B1 | 12/2008 | Carmichael et al. | |
| 7,516,468 B1 | 4/2009 | Deller et al. | |
| 7,523,180 B1 | 4/2009 | DeLuca et al. | |
| 7,587,415 B2 | 9/2009 | Gaurav et al. | |
| 7,624,416 B1 | 11/2009 | Vandermolen et al. | |
| 7,640,487 B2 | 12/2009 | Amielh-Caprioglio et al. | |
| 7,702,315 B2 | 4/2010 | Engstrom et al. | |
| 7,703,116 B1 | 4/2010 | Moreau et al. | |
| 7,721,307 B2 | 5/2010 | Hendricks et al. | |
| 7,743,330 B1 | 6/2010 | Hendricks et al. | |
| 7,752,258 B2 | 7/2010 | Lewin et al. | |
| 7,861,259 B2 | 12/2010 | Barone, Jr. | |
| 7,913,286 B2 | 3/2011 | Sarachik et al. | |
| 7,958,528 B2 | 6/2011 | Moreau et al. | |
| 7,975,277 B1 * | 7/2011 | Jerding | H04N 7/165 725/25 |
| 8,006,262 B2 * | 8/2011 | Rodriguez | H04N 7/17318 725/37 |
| 8,032,914 B2 * | 10/2011 | Rodriguez | H04N 21/2385 725/9 |
| 8,156,533 B2 | 4/2012 | Crichton | |
| 8,220,018 B2 | 7/2012 | de Andrade et al. | |
| 8,266,652 B2 | 9/2012 | Roberts et al. | |
| 8,296,805 B2 | 10/2012 | Tabatabai et al. | |
| 8,381,259 B1 | 2/2013 | Khosla | |
| 8,448,208 B2 | 5/2013 | Moreau et al. | |
| 8,660,545 B1 | 2/2014 | Redford et al. | |
| 8,699,862 B1 | 4/2014 | Sharifi et al. | |
| 8,850,495 B2 | 9/2014 | Pan | |
| 8,863,196 B2 | 10/2014 | Patil et al. | |
| 8,938,675 B2 | 1/2015 | Holladay et al. | |
| 8,943,533 B2 | 1/2015 | de Andrade et al. | |
| 8,973,063 B2 | 3/2015 | Spilo et al. | |
| 9,021,528 B2 | 4/2015 | Moreau et al. | |
| 9,363,560 B2 | 6/2016 | Moreau et al. | |
| 9,473,548 B1 | 10/2016 | Chakrovorthy et al. | |
| 9,516,253 B2 | 12/2016 | De Andrade et al. | |
| 2001/0014206 A1 | 8/2001 | Artigalas et al. | |
| 2001/0027563 A1 | 10/2001 | White et al. | |
| 2001/0049823 A1 | 12/2001 | Matey | |
| 2001/0056573 A1 | 12/2001 | Kovac et al. | |
| 2001/0056577 A1 | 12/2001 | Gordon et al. | |
| 2002/0010928 A1 | 1/2002 | Sahota | |
| 2002/0016969 A1 | 2/2002 | Kimble | |
| 2002/0023270 A1 | 2/2002 | Thomas et al. | |
| 2002/0026642 A1 | 2/2002 | Augenbraun et al. | |
| 2002/0032905 A1 * | 3/2002 | Sherr | G06F 21/10 725/38 |
| 2002/0041104 A1 | 4/2002 | Graf et al. | |
| 2002/0042915 A1 | 4/2002 | Kubischta et al. | |
| 2002/0042920 A1 | 4/2002 | Thomas et al. | |
| 2002/0046099 A1 | 4/2002 | Frengut et al. | |
| 2002/0059094 A1 | 5/2002 | Hosea et al. | |
| 2002/0059586 A1 | 5/2002 | Carney et al. | |
| 2002/0059629 A1 | 5/2002 | Markel | |
| 2002/0067376 A1 | 6/2002 | Martin et al. | |
| 2002/0069407 A1 * | 6/2002 | Fagnani et al. | 725/35 |
| 2002/0070978 A1 | 6/2002 | Wishoff et al. | |
| 2002/0078444 A1 | 6/2002 | Krewin et al. | |
| 2002/0078449 A1 | 6/2002 | Gordon et al. | |
| 2002/0083450 A1 | 6/2002 | Kamen et al. | |
| 2002/0100041 A1 | 7/2002 | Rosenberg et al. | |
| 2002/0107973 A1 | 8/2002 | Lennon et al. | |
| 2002/0108121 A1 * | 8/2002 | Alao | H04L 65/4092 725/110 |
| 2002/0108122 A1 | 8/2002 | Alao et al. | |
| 2002/0120609 A1 | 8/2002 | Lang et al. | |
| 2002/0124254 A1 | 9/2002 | Kikinis | |
| 2002/0124256 A1 * | 9/2002 | Suzuka | H04N 5/44543 725/55 |
| 2002/0144269 A1 | 10/2002 | Connelly | |
| 2002/0144273 A1 | 10/2002 | Reto | |
| 2002/0147645 A1 * | 10/2002 | Alao | G06Q 30/0209 705/14.54 |
| 2002/0152477 A1 | 10/2002 | Goodman et al. | |
| 2002/0156839 A1 | 10/2002 | Peterson et al. | |
| 2002/0156890 A1 | 10/2002 | Carlyle et al. | |
| 2002/0162120 A1 | 10/2002 | Mitchell | |
| 2002/0169885 A1 | 11/2002 | Alao et al. | |
| 2002/0170059 A1 | 11/2002 | Hoang | |
| 2002/0171691 A1 | 11/2002 | Currans et al. | |
| 2002/0171940 A1 | 11/2002 | He et al. | |
| 2002/0184629 A1 | 12/2002 | Sie et al. | |
| 2002/0188944 A1 | 12/2002 | Noble | |
| 2002/0196268 A1 | 12/2002 | Wolff et al. | |
| 2002/0199187 A1 * | 12/2002 | Gissin | G06F 3/0481 725/32 |
| 2002/0199190 A1 * | 12/2002 | Su | G06Q 30/0209 725/37 |
| 2003/0001880 A1 | 1/2003 | Holtz et al. | |
| 2003/0005444 A1 * | 1/2003 | Crinon | H04N 7/16 725/50 |
| 2003/0005453 A1 | 1/2003 | Rodriguez et al. | |
| 2003/0014752 A1 | 1/2003 | Zaslavsky et al. | |
| 2003/0014753 A1 | 1/2003 | Beach et al. | |
| 2003/0018755 A1 | 1/2003 | Masterson et al. | |
| 2003/0023970 A1 | 1/2003 | Panabaker | |
| 2003/0025832 A1 | 2/2003 | Swart et al. | |
| 2003/0028871 A1 | 2/2003 | Wang et al. | |
| 2003/0028873 A1 | 2/2003 | Lemmons | |
| 2003/0041104 A1 | 2/2003 | Wingard et al. | |
| 2003/0051246 A1 | 3/2003 | Wilder et al. | |
| 2003/0056216 A1 | 3/2003 | Wugofski et al. | |
| 2003/0056218 A1 | 3/2003 | Wingard et al. | |
| 2003/0058948 A1 | 3/2003 | Kelly et al. | |
| 2003/0066081 A1 | 4/2003 | Barone et al. | |
| 2003/0067554 A1 * | 4/2003 | Klarfeld et al. | 348/461 |
| 2003/0068046 A1 * | 4/2003 | Lindqvist | G06F 17/30867 380/277 |
| 2003/0070170 A1 | 4/2003 | Lennon | |
| 2003/0079226 A1 | 4/2003 | Barrett | |
| 2003/0084443 A1 | 5/2003 | Laughlin et al. | |
| 2003/0084444 A1 | 5/2003 | Ullman et al. | |
| 2003/0084449 A1 | 5/2003 | Chane et al. | |
| 2003/0086694 A1 | 5/2003 | Davidsson | |
| 2003/0093790 A1 | 5/2003 | Logan et al. | |
| 2003/0093792 A1 * | 5/2003 | Labeeb et al. | 725/46 |
| 2003/0097657 A1 * | 5/2003 | Zhou et al. | 725/46 |
| 2003/0110500 A1 | 6/2003 | Rodriguez | |
| 2003/0110503 A1 * | 6/2003 | Perkes | 725/86 |
| 2003/0115219 A1 | 6/2003 | Chadwick | |
| 2003/0115612 A1 | 6/2003 | Mao et al. | |
| 2003/0126601 A1 | 7/2003 | Roberts et al. | |
| 2003/0132971 A1 | 7/2003 | Billmaier et al. | |
| 2003/0135464 A1 * | 7/2003 | Mourad et al. | 705/50 |
| 2003/0140097 A1 * | 7/2003 | Schloer | 709/203 |
| 2003/0151621 A1 * | 8/2003 | McEvilly et al. | 345/744 |
| 2003/0158777 A1 | 8/2003 | Schiff et al. | |
| 2003/0172370 A1 | 9/2003 | Satuloori et al. | |
| 2003/0177501 A1 | 9/2003 | Takahashi et al. | |
| 2003/0182663 A1 | 9/2003 | Gudorf et al. | |
| 2003/0189668 A1 | 10/2003 | Newnam et al. | |
| 2003/0204814 A1 | 10/2003 | Elo et al. | |
| 2003/0204846 A1 | 10/2003 | Breen et al. | |
| 2003/0204854 A1 | 10/2003 | Blackketter et al. | |
| 2003/0207696 A1 | 11/2003 | Willenegger et al. | |
| 2003/0226141 A1 | 12/2003 | Krasnow et al. | |
| 2003/0229899 A1 | 12/2003 | Thompson et al. | |
| 2004/0003402 A1 | 1/2004 | McKenna | |
| 2004/0003404 A1 | 1/2004 | Boston et al. | |
| 2004/0019900 A1 | 1/2004 | Knightbridge et al. | |
| 2004/0019908 A1 | 1/2004 | Williams et al. | |
| 2004/0022271 A1 * | 2/2004 | Fichet | G06F 9/4843 370/486 |
| 2004/0024753 A1 * | 2/2004 | Chane | H04N 21/23109 |
| 2004/0025180 A1 | 2/2004 | Begeja et al. | |
| 2004/0031015 A1 | 2/2004 | Ben-Romdhane et al. | |
| 2004/0031058 A1 | 2/2004 | Reisman | |
| 2004/0031062 A1 | 2/2004 | Lemmons | |
| 2004/0039754 A1 | 2/2004 | Harple | |

(56) References Cited

U.S. PATENT DOCUMENTS

| | | |
|---|---|---|
| 2004/0073915 A1 | 4/2004 | Dureau |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0168186 A1* | 8/2004 | Rector, Jr. ............ H04H 60/06 725/39 |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0225751 A1 | 11/2004 | Urali |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0204385 A1 | 9/2005 | Sull et al. |
| 2005/0259147 A1 | 11/2005 | Nam et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1 | 4/2006 | Nishikawa et al. |
| 2006/0104511 A1 | 5/2006 | Guo et al. |
| 2006/0125962 A1 | 6/2006 | Shelton et al. |
| 2006/0143191 A1 | 6/2006 | Cho et al. |
| 2006/0156336 A1 | 7/2006 | Knudson et al. |
| 2006/0195865 A1 | 8/2006 | Fablet |
| 2006/0206470 A1 | 9/2006 | McIntyre |
| 2006/0206912 A1* | 9/2006 | Klarfeld et al. ............... 725/40 |
| 2006/0233514 A1 | 10/2006 | Weng et al. |
| 2006/0248572 A1 | 11/2006 | Kitsukama et al. |
| 2007/0019001 A1 | 1/2007 | Ha |
| 2007/0064715 A1 | 3/2007 | Lloyd et al. |
| 2007/0083538 A1 | 4/2007 | Roy et al. |
| 2007/0112761 A1 | 5/2007 | Xu et al. |
| 2007/0157247 A1 | 7/2007 | Cordray et al. |
| 2007/0220016 A1 | 9/2007 | Estrada et al. |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0148317 A1 | 6/2008 | Opaluch |
| 2008/0163304 A1 | 7/2008 | Ellis |
| 2008/0189740 A1 | 8/2008 | Carpenter et al. |
| 2008/0196070 A1 | 8/2008 | White et al. |
| 2008/0235725 A1 | 9/2008 | Hendricks |
| 2008/0276278 A1 | 11/2008 | Krieger et al. |
| 2008/0282294 A1 | 11/2008 | Carpenter et al. |
| 2008/0288644 A1 | 11/2008 | Gilfix et al. |
| 2008/0301320 A1 | 12/2008 | Morris |
| 2008/0301732 A1 | 12/2008 | Archer et al. |
| 2008/0317233 A1 | 12/2008 | Rey et al. |
| 2009/0019485 A1 | 1/2009 | Ellis et al. |
| 2009/0024629 A1 | 1/2009 | Miyauchi |
| 2009/0094632 A1 | 4/2009 | Newnam et al. |
| 2009/0094651 A1 | 4/2009 | Damm et al. |
| 2009/0133025 A1 | 5/2009 | Malhotra et al. |
| 2009/0164904 A1 | 6/2009 | Horowitz et al. |
| 2009/0183210 A1 | 7/2009 | Andrade |
| 2009/0222872 A1 | 9/2009 | Schlack |
| 2009/0228441 A1 | 9/2009 | Sandvik |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2010/0257548 A1 | 10/2010 | Lee et al. |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0209180 A1 | 8/2011 | Ellis et al. |
| 2011/0211813 A1 | 9/2011 | Marks |
| 2011/0214143 A1 | 9/2011 | Rits et al. |
| 2011/0219386 A1 | 9/2011 | Hwang et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2012/0002111 A1 | 1/2012 | Sandoval et al. |
| 2012/0011550 A1 | 1/2012 | Holland |
| 2012/0054811 A1 | 3/2012 | Spears |
| 2012/0117151 A1 | 5/2012 | Bill |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1 | 12/2012 | Thomas et al. |
| 2013/0014155 A1 | 1/2013 | Clarke et al. |
| 2013/0040623 A1 | 2/2013 | Chun et al. |
| 2013/0051770 A1 | 2/2013 | Sargent |
| 2013/0103446 A1 | 4/2013 | Bragdon et al. |
| 2013/0110769 A1 | 5/2013 | Ito |
| 2013/0111514 A1 | 5/2013 | Slavin et al. |
| 2013/0170813 A1 | 7/2013 | Woods et al. |
| 2013/0176493 A1 | 7/2013 | Khosla |
| 2013/0198642 A1 | 8/2013 | Carney et al. |
| 2013/0262997 A1 | 10/2013 | Markworth et al. |
| 2013/0298038 A1 | 11/2013 | Spivack et al. |
| 2013/0316716 A1 | 11/2013 | Tapia et al. |
| 2013/0326570 A1 | 12/2013 | Cowper et al. |
| 2013/0332839 A1 | 12/2013 | Frazier et al. |
| 2013/0347018 A1 | 12/2013 | Limp et al. |
| 2013/0347030 A1 | 12/2013 | Oh et al. |
| 2014/0006951 A1 | 1/2014 | Hunter |
| 2014/0009680 A1 | 1/2014 | Moon et al. |
| 2014/0032473 A1 | 1/2014 | Enoki et al. |
| 2014/0068648 A1 | 3/2014 | Green et al. |
| 2014/0075465 A1 | 3/2014 | Petrovic et al. |
| 2014/0089423 A1 | 3/2014 | Jackels |
| 2014/0089967 A1 | 3/2014 | Mandalia et al. |
| 2014/0129570 A1 | 5/2014 | Johnson |
| 2014/0149918 A1 | 5/2014 | Asokan et al. |
| 2014/0150022 A1 | 5/2014 | Oh et al. |
| 2014/0237498 A1 | 8/2014 | Ivins |
| 2014/0267931 A1 | 9/2014 | Gilson et al. |
| 2014/0279852 A1 | 9/2014 | Chen |
| 2014/0280695 A1 | 9/2014 | Sharma et al. |
| 2014/0282122 A1 | 9/2014 | Mathur |
| 2014/0325359 A1 | 10/2014 | Vehovsky et al. |
| 2014/0327677 A1 | 11/2014 | Walker |
| 2014/0359662 A1 | 12/2014 | Packard et al. |
| 2014/0365302 A1 | 12/2014 | Walker |
| 2014/0373032 A1 | 12/2014 | Merry et al. |
| 2015/0026743 A1 | 1/2015 | Kim et al. |
| 2015/0263923 A1 | 9/2015 | Kruglick |

FOREIGN PATENT DOCUMENTS

| | | |
|---|---|---|
| EP | 0963115 | 12/1999 |
| EP | 0963115 A1 | 12/1999 |

(56) References Cited

FOREIGN PATENT DOCUMENTS

| | | | | |
|---|---|---|---|---|
| EP | 1058999 | A1 | 12/2000 | |
| EP | 1080582 | A1 | 3/2001 | |
| EP | 1080582 | | 3/2003 | |
| EP | 1058999 | | 4/2003 | |
| GB | 2323489 | A | 9/1998 | |
| JP | WO 2001084830 | * | 11/2001 | ......... H04N 5/44543 |
| WO | 99/63757 | | 12/1999 | |
| WO | 9963757 | A1 | 12/1999 | |
| WO | 0011869 | | 3/2000 | |
| WO | 0011869 | A1 | 3/2000 | |
| WO | 00/33576 | | 6/2000 | |
| WO | 0033576 | A1 | 6/2000 | |
| WO | 0110115 | A1 | 2/2001 | |
| WO | 0182613 | | 11/2001 | |
| WO | 0182613 | A1 | 11/2001 | |
| WO | 02063426 | | 8/2002 | |
| WO | 02063426 | A2 | 8/2002 | |
| WO | 02063471 | | 8/2002 | |
| WO | 02063471 | A2 | 8/2002 | |
| WO | 02063851 | | 8/2002 | |
| WO | 02063851 | A2 | 8/2002 | |
| WO | 02063878 | | 8/2002 | |
| WO | 02063878 | A2 | 8/2002 | |
| WO | 03/009126 | | 1/2003 | |
| WO | 03009126 | A1 | 1/2003 | |
| WO | 2003/026275 | A2 | 3/2003 | |
| WO | 2011/053271 | A1 | 5/2011 | |
| WO | 2012/094105 | A1 | 7/2012 | |
| WO | 2012/154541 | A1 | 11/2012 | |

OTHER PUBLICATIONS

Fernando Periera, "The MPEG-4 Book", Prentice Hall, Jul. 10, 2002.
Michael Adams, "Open Cable Architecture", Cisco Press, Dec. 3, 1999.
Mark Riehl, "XML and Perl", Sams, Oct. 16, 2002.
MetaTV, Inc., PCT/US02/29917 filed Sep. 19, 2002, International Search Report dated Apr. 14, 2003; ISA/US; 6 pages.
Sylvain Devillers, "Bitstream Syntax Definition Language: an Input to MPEG-21 Content Representation", Mar. 2001, ISO, ISO/IEC JTC1/SC29/WG11 MPEG01/M7053.
U.S. Appl. No. 10/618,210, Programming contextual interactive user interface for television, filed Jul. 11, 2003.
U.S. Appl. No. 10/672,983, System and method for controlling iTV application behaviors through the use of application profile filters, filed Sep. 25, 2003.
U.S. Appl. No. 10/247,901, Interactive user interface for television applications, filed Sep. 19, 2002.
U.S. Appl. No. 10/630,815, System and method for construction, delivery and display of iTV content, filed Jul. 29, 2003.
U.S. Appl. No. 10/933,845, System and Method for Preferred Placement Programing of iTV Content, filed Sep. 2, 2004.
U.S. Appl. No. 10/635,799, User customization of user interfaces for interactive television, filed Aug. 5, 2003.
U.S. Appl. No. 10/894,740, Channel family surf control, filed Jul. 19, 2004.
U.S. Appl. No. 10/925,737, Contextual navigational control for digital television, filed Aug. 24, 2004.
U.S. Appl. No. 12/877,492, Verification of Semantic Constraints in Multimedia Data and in its Announcement, Signaling and Interchange, filed Sep. 8, 2010.
U.S. Appl. No. 13/049,948, System and Method for Construction, Delivery and Display of iTV Applications that Blend Programming Information of On-Demand and Broadcast Service Offerings, filed Mar. 17, 2011.
U.S. Appl. No. 13/161,879, System and Method for Construction, Delivery and Display of iTV Content, filed Jun. 16, 2011.
Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.
Extended European Search Report—EP14159227.9—dated Sep. 3, 2014.
Canadian Office Action—CA 2,685,833—dated Jan. 22, 2015.
European Extended Search Report—EP 13192112.4—dated May 11, 2015.
Nov. 29, 2017—Canadian Office Action—CA 2,685,833.
CA Office Action—CA App 2,685,833—dated Jan. 27, 2016.
Feb. 19, 2018—European Summons to Oral Proceedings—EP 14159227.9.
CA Response to Office Action—CA Appl. 2,685,833—dated Jul. 17, 2015.
Response to European Office Action—European Appl. 13192112. 4—dated Dec. 9, 2015.
CA Office Action—CA Application 2685833—dated Feb. 8, 2017.
Jul. 31, 2018—European Decision to Refuse—14159227.9.
Nov. 6, 2019—Canadian Office Action—CA 2,832,800.
Sep. 5, 2019—Canadian Office Action—CA 2,685,833.
Apr. 21, 2020—European Summons to Oral Proceedings—EP 09175979.5.
Aug. 24, 2020, Canadian Office Action, CA 2,832,800.
Mar. 9, 2018—European Office Action—EP 13192112.4.

* cited by examiner

METHOD AND SYSTEM FOR ENABLING DATA-RICH INTERACTIVE TELEVISION USING BROADCAST DATABASE

RELATED APPLICATIONS

The present application is related to, incorporates by reference and hereby claims the priority benefit of the following U.S. Provisional Patent Applications:
   a. Application No. 60/333,961 entitled "Broadcast Database", filed Nov. 27, 2001.
   b. Application No. 60/353,799 entitled "Broadcast Database", filed Jan. 30, 2002.

FIELD OF THE INVENTION

The present invention relates to a broadcast database, which in one embodiment serves as an architecture for enabling data-rich interactive television and similar applications.

BACKGROUND

In the past few years, home entertainment has evolved from purely one-way radio and television broadcasts to include two-way communication that encompasses interactive games, video on demand (VOD), educational fare and consumer-oriented services (e.g., interactive shopping). For the most part, these services have been offered through familiar cable and satellite television distribution systems.

Broadly speaking, there are two paradigms for using cable and satellite systems in this fashion. One is computer-centric: using an installed satellite or cable feed (perhaps with a cable or telephone network back channel) as a high-bandwidth conduit to bring on-line computing services, such as Internet access, into the home. The second is television-centric: adding interactive functions to television programming.

In general, systems deployed using the television-centric model have been grouped under the label "interactive television" or iTV. iTV is generally understood as the convergence of Internet-like interactivity and traditional television programming and delivery technology. Making television interactive involves the addition of responsive, user-controlled elements to traditional broadcast video and audio signals. By adding a computer like device (usually referred to as a set-top box) to the television set and providing a communication path back to the service provider (the back channel), the viewer can be invited to interact with the programming, exert some level of control over the experience and to provide feedback.

iTV services are usually delivered to subscribers' homes through an existing cable or satellite system, along with other free and pay-for content (e.g., movies, games, news, images, audio programming, etc.). This content is generally delivered to the television via a set-top box, and users may navigate the offered services using a remote control and on-screen navigation system or menu. The set-top box is an addressable communications unit needed to decode signals as they arrive at the television. Depending on the system used it may also need to perform functions such as the decompression of the digital signal, or the handling of communications across the back channel. Together with a (typically handheld) remote control and on-screen menu, this unit provides an interface for users to find their way through the myriad of content and services offered and communicated to their television sets by the iTV system provider.

To illustrate, consider the case of a user ordering a pay-per-view movie. Using a remote control the user can select the desired service via the on-screen menu displayed on his or her television set. This request is sent via the back channel to the service provider's control system, which locates the required content and delivers it via a cable or satellite transmission system to the set-top box for decoding and display on the user's television. Along the way, a subscriber management system may be informed of the user's selection so that the user's account can be updated to reflect any relevant charges for the selected movie.

The on-screen menu may or may not be overlaid on top of the television picture. Common examples of on-screen menus include electronic program guides (EPGs), electronic catalogs, and advertising information. Television program guides have matured rapidly in recent years. At one time the only TV program guides available were those printed in newspapers and magazines. These guides typically had a grid with list of channels, showing the programming for those channels as a function of time. They also sometimes contained synopses of movies or television shows scheduled to be aired.

The advent of cable television systems brought on-screen EPGs. The early versions consisted of a dedicated channel displaying a program guide that showed the current (and perhaps limited future) programming for most or all channels. Since there is only space to show half a dozen or so channels on the screen at a time, the display would automatically scroll through all the available channels.

Today, however, many cable companies utilize set-top boxes to provide interactive EPGs that support advanced features such as the ability to call up a program guide grid at any time, and scroll through channels and programming forward and backward in time via a remote control. Usually information on programming for some days into the future is made available. In addition, modem EPGs can display lists of channel numbers, program titles and even program durations, appearing briefly each time the channel is changed, and at other times by selecting a corresponding option on the remote control. Textual descriptions of any program listed in the program grid, or of the current program being viewed, can be called up by using the remote control, and a user can change channels automatically by clicking on a program title as it is displayed in the program grid.

All of these advanced features place demands on the set-top boxes being used. For example, tradeoffs between cost and local storage capabilities must be addressed. One option is to deploy set-top boxes with large internal storage capabilities. Then, large quantities of information (such as expanded EPGs) could be periodically downloaded to the set-top boxes and stored for later reference. However, such set-top boxes would likely be expensive and, with the industry shift towards low-cost set-top boxes, iTV middleware solutions are required to operate in a broadcast architecture with very small set-top box memory availability.

One solution to address the limited storage capabilities of set-top boxes that has been proposed is the use of a so-called broadcast file system, as described in U.S. Pat. No. 6,405,239 to Addington et al. The broadcast file system organizes data sent to a set-top box into a hierarchical file system including a directory index. The hierarchical file system is made up of various directories and subdirectories of content, which can be created, updated and/or deleted by a service provider and then broadcast to a number of set-top box clients. The set-top boxes cache the directory index portion of the file system and use it to facilitate requests for further information or content (e.g., in response to user selection or application request) from the hierarchical file system. Because the file system is continually broadcast (e.g., using a carousel), the set-top boxes need not cache the entire file system because the desired content can be downloaded from the broadcast stream in response to a user request. If the desired content is not currently part of the broadcast stream when requested, it can be added by introducing the necessary directories and subdirectories to the hierarchical file system in response to the request.

The broadcast file system solves some of the problems posed by the limited available memory at the set-top boxes, but it has several limitations. Among these limitations is the fact that relational databases are not supported in the hierarchical file system. Instead, any database must be reduced to simple tables and the tables then broadcast as if they were part of the hierarchical file system. This reduces the functionality available to a user seeking to query a service provider's offerings. For example, the user is limited to the tables selected by the service provider for broadcast and in the format defined thereby.

To understand how the tables used by the broadcast file system differ from true databases, consider the following. Early computer-based file systems allowed for record keeping in the form of tables that were made up of rows and columns. The rows were referred to as records and the columns were known as fields; in order to find a particular piece of information a user browsed through the table and then extracted the needed field or fields from the desired record.

As the volume of data stored in computer-based systems increased, more flexible storage models (databases) were created. Databases are computer-based record keeping systems that allow for the sharing of data among multiple users through manipulation of user interface tools or command line interfaces that handle the storage, retrieval and modification of the data. Of the various forms of databases available, relational databases have become perhaps the most popular.

At the core of the relational database model are the familiar tables (also known as relations) made up of records (rows or tuples) and fields (columns or attributes). A relational database stores data in separate tables rather than putting all the data in one big table. Where or how these tables are stored makes no difference, because the tables are linked by defined relations. This makes it possible to combine data from several tables on request.

Operations that manipulate (i.e., store, retrieve or modify) data in a relational database do so on the basis of the data values themselves. Thus, if a user wishes to retrieve a row from a particular table, he or she does so by comparing the value stored within a particular column for that row to some search criteria. Of course, tables of a relational database can store not only actual data, they can also be used as a means for generating meta-data (data about the table and field names which form the database structure, access privileges to the database, data validation rules, etc.). Thus, relational systems can use operations recursively in order to provide information about the database.

Relational databases are often searched using a so-called structured query language (SQL). SQL provides the structure and idioms needed to query a relational database in a platform-independent fashion. Rather than referring to data as a set of pointers, the SQL provides predefined procedures that allow users to use any value in a table to relate to other tables in a database. Most modern relational databases are SQL databases that are composed of a set of row/column-based tables, indexed by a "data dictionary". To access data in the tables, users employ the SQL to navigate the database and produce "views" based on various search criteria defined in a query. The data dictionary is a catalog maintained by the database that includes a list of all the tables in the database and pointers to their locations in the storage medium. When an SQL query is made, the database looks up the table referred to by the query in the data dictionary in order to know where to go to execute the search. The resulting view is essentially a dynamically generated result table that contains the data retrieved from the table specified in the query according to the user-provided search criteria.

The broadcast file system discussed above does not support the type of dynamic operations that are available using databases. For example, the tables are not linked in the fashion of a relational database and dynamic queries and results of the types supported and provided by relational databases are not available. Instead, with the broadcast file system users are permitted only to extract information included in the table fields and in the format that the service provider has determined. Accordingly, what is needed is a solution other than the broadcast file system if true database functionality is to be provided in an iTV context to support EPGs and other applications.

SUMMARY OF THE INVENTION

In one embodiment, the present invention provides for downloading, from a broadcast carousel, one or more data modules composed from a database, each of the data modules including record sets, and one or more modules containing computer-readable instructions for resolving a query using one or more of the record sets. Thereafter, the computer-readable instructions are executed to resolve the query. Prior to downloading the one or more data modules, a table of contents module that includes a description of how the data modules are composed may be downloaded. The table of contents module may also include a description of types of modules containing computer-readable instructions available from the broadcast carousel. When available, the results produced by executing the query may be displayed on a television.

The data modules are composed from the database during a packaging process that includes optimization procedures for broadcasting the data modules via the broadcast carousel. Different optimization procedures may be used, including staggering those data modules needed for the query in a broadcast data stream with other data modules not needed for the query, broadcasting multiple copies of those data modules needed for the query in a broadcast data stream, and broadcasting one or more of those data modules needed for the query via a broadcast carousel different from that used for different data modules. Further, the packaging process may provide for compressing the data modules prior to transmission.

In a further embodiment, database modules are compressed, formatted, and sequenced for transmission in a television broadcast system based on bandwidth availability; and then transmitted to a receiver. Compressing and formatting the database modules may include subdividing data from a source database into tables and splitting the tables into the database modules. Sequencing the database modules may include repeating selected ones of the database modules in a broadcast data stream, staggering selected ones of the database modules with respect to one another in a broadcast data stream, and/or transmitting selected ones of the database modules in different broadcast data streams.

Yet another embodiment provides for formatting, at a set top box, a query for information included in one or more modules which represent components of an original data source; and downloading through a television broadcast stream those of the one or more modules which are not currently located at the set-top box, wherein the one or more modules include data modules and/or modules of computer readable instructions for use when executing queries on the data modules, each of the data modules formed as a result of formatting and compressing at least portions of the original data source. The query may be executed by performing actions designated by the computer-readable instructions to retrieve the information. Thereafter, the information may be displayed on a television.

In some embodiments, information regarding the queries may be provided as feedback to the server so that the packaging and/or broadcasting methods employed with respect to the data and/or code modules may be modified to provide improved usability.

Still another embodiment provides a server component configured to broadcast via a broadcast stream a database as a set of modules including data modules that contain record sets, code modules that include computer-readable instructions for resolving queries using one or more of the data modules, and a table of contents module that contains information regarding the data modules and the code modules; and a client component that includes a query interface configured to retrieve from the broadcast stream those data modules and code modules not currently residing in memory at the client component as are needed to resolve a request made through the query interface. The server component may be configured to optimize the set of modules for broadcast via the broadcast stream by staggering those data modules needed to resolve the request in the broadcast data stream with other data modules not needed to resolve the request, by broadcasting multiple copies of those data modules needed to resolve the request in the broadcast data stream, and/or by using a different broadcast data stream for different data modules.

BRIEF DESCRIPTION OF THE DRAWINGS

The present invention is illustrated by way of example, and not limitation, in the figures of the accompanying drawings, in which.

DETAILED DESCRIPTION

Figure 1:
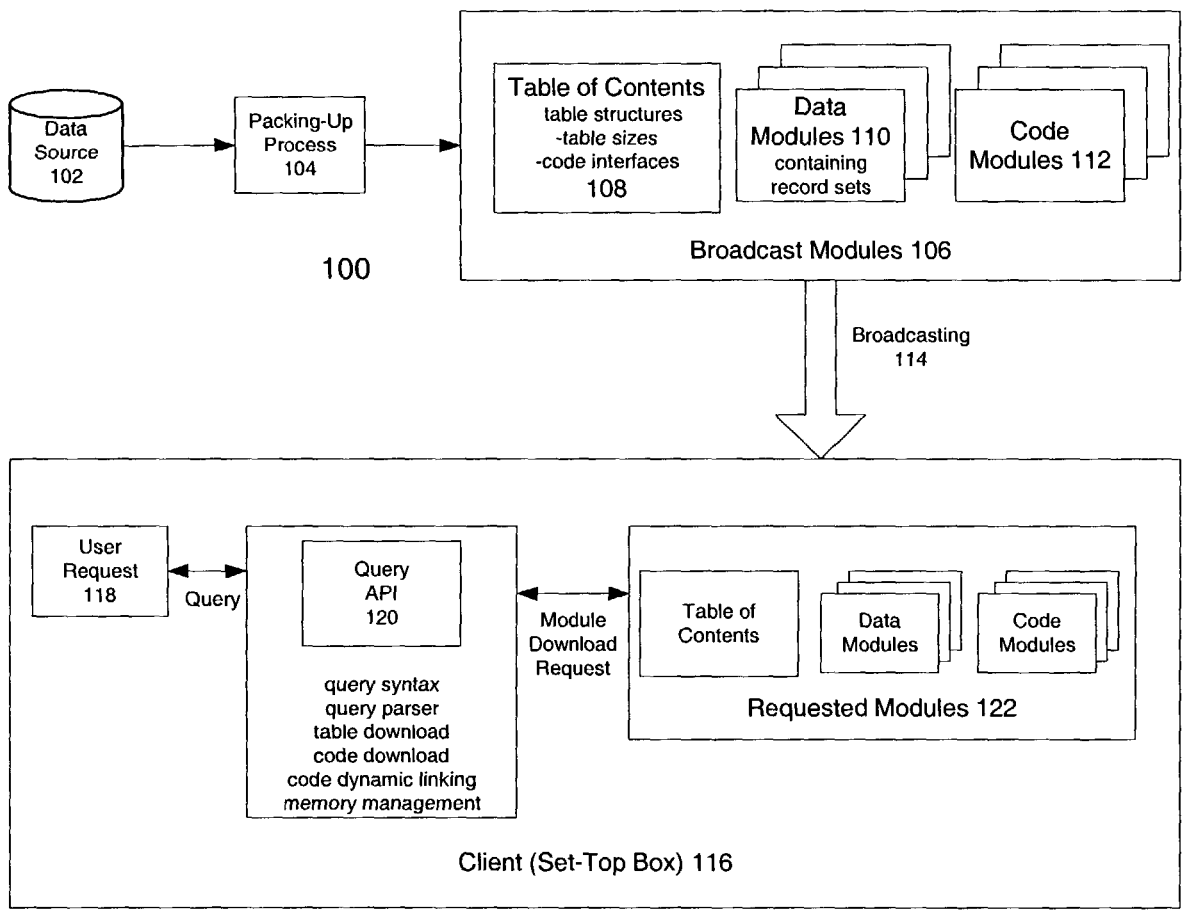
FIG. 1 illustrates the use of a broadcast database in an iTV environment, in accordance with one embodiment of the present invention.

In one embodiment, the present invention provides a method for packaging, compressing, streaming, and/or querying a database via broadcast delivery. The database may be a relational database, an object oriented database, an ISAM (index sequence access method) database or any other form of database. In this context, the terms packaging and compressing refer to a process for compressing data into a defined, organized, structure that may easily be queried for application use. Streaming refers to a method for streaming a packaged database. A query is a method for retrieving stored data efficiently from the streamed database.

Some of the materials below describe algorithmic operations performed by computer-based systems and devices as part of the present invention. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One implementation of the present invention may be realized in computer software (i.e., computer-readable instructions for execution by computer-based systems and devices). Such software may be embodied on one or more computer readable media, for example hard drives, floppy discs, read-only memory, read-write memory or other media. The software may be distributed on such media or it may be provided via the Internet or other networks in the form of downloadable modules or other formats. In operation, the functionality provided by such software may be distributed among various servers and client devices, such as set-top boxes.

When referring to the modules that make up elements of the present broadcast database, the term module refers to a modular data or code resource that is formatted and compressed for broadcast. Moreover, a table, as that term is used below, can be any data structure. With these concepts in mind, we turn now to a more detailed discussion of the broadcast database that is an embodiment of the present invention.

As indicated above, broadcasting iTV services generally requires that much more than just television video and audio signals be transmitted to the end-user. To accommodate the additional data, the present invention makes use of a broadcast database. This includes a method of compressing, formatting, and sequencing data for use in a broadcast system based on bandwidth availability/limitations. The goal of these compression/formatting/sequencing methods is to decrease the needed bandwidth for data on the broadcast and to optimize the speed of data look-ups and searches.

Referring now to FIG. 1, a functional view of the infrastructure supporting the broadcast database systems and methods is presented. At a broadcast center 100, information from data source (database) 102 is packaged up according to a packing up process 104 to produce broadcast modules 106. These broadcast modules 106 include a table of contents module 108, a number of data modules 110 and code modules 112. The table of contents 108 includes information regarding the sizes and structures of the data modules 110 as well as information regarding interfaces for the code modules 112. The data modules 110 are made up of various record sets of information from the original data source 102. The code modules 112 include computer-readable instructions for resolving queries using the various record sets contained in the data modules 110.

The broadcast modules 106 are broadcast over a conventional broadcast delivery network 114 (e.g., in one or more carousels) and subsequently downloaded by a set top box 116. This downloading is performed in response to a user or application request 118 made through a query interface 120 that is part of the firmware or operating system of the set top box 116. In order to resolve the query, and using information from the table of contents 108, the set top box downloads the necessary data modules and code modules (requested modules 122) from the broadcast carousel. Using the code modules so downloaded, the query engine executes the query to extract relevant data from the downloaded data modules and provides the results in response to the original request.

This use of a broadcast database provides some fundamental distinctions over prior methods of accessing databases to resolve queries. For example, the use of a broadcast database allows queries to be resolved locally at the set top box. In prior client-server architectures (and here the broadcast center may be regarded as a server and the set top box as a client), the database was maintained at the server and queries from the client were transmitted across a network to be resolved at the server. Results were then returned via the network to the client for display to a user.

Further, the use of a broadcast database provides advantages over the use of a broadcast file system. For example, in the broadcast file system model, users were limited to the tables and layouts provided by the broadcaster. The concept of individual queries being resolved against the broadcaster's entire database of information was not supported. Instead, users were limited in the types of queries that could be made and in the format of responses thereto. With the present broadcast database, however, individual user queries are supported and results can be customized to each such inquiry.

An example will help to explain this distinction. Suppose a user is interested in searching for a list of movies starring a certain actor. In the prior broadcast file system model, whether or not such a query could even be executed would depend on whether or not the broadcaster has chosen to include a table of movies for each actor as part of the hierarchy. Only then could the user download that table and scroll through the list of available movies.

In the present broadcast database system, however, the user simply provides a query for such a list of movies and in response the set top box downloads the relevant modules from the broadcast carousel as well as the computer-readable instructions necessary to execute the query against these tables. These instructions are run and the results displayed. In this model the broadcaster need not provide separate tables of all movies for each actor as part of the broadcast carousel. Instead, relational modules (perhaps a movies table and an actors table with some form of defined relationship(s) between them) are broadcast along with the computer-readable instructions necessary to extract the requested data from these modules. With this approach, the bandwidth required by the broadcast database is far less than that which would be required by the broadcast file system to provide the same sort of functionality to the end user.

Figure 2:
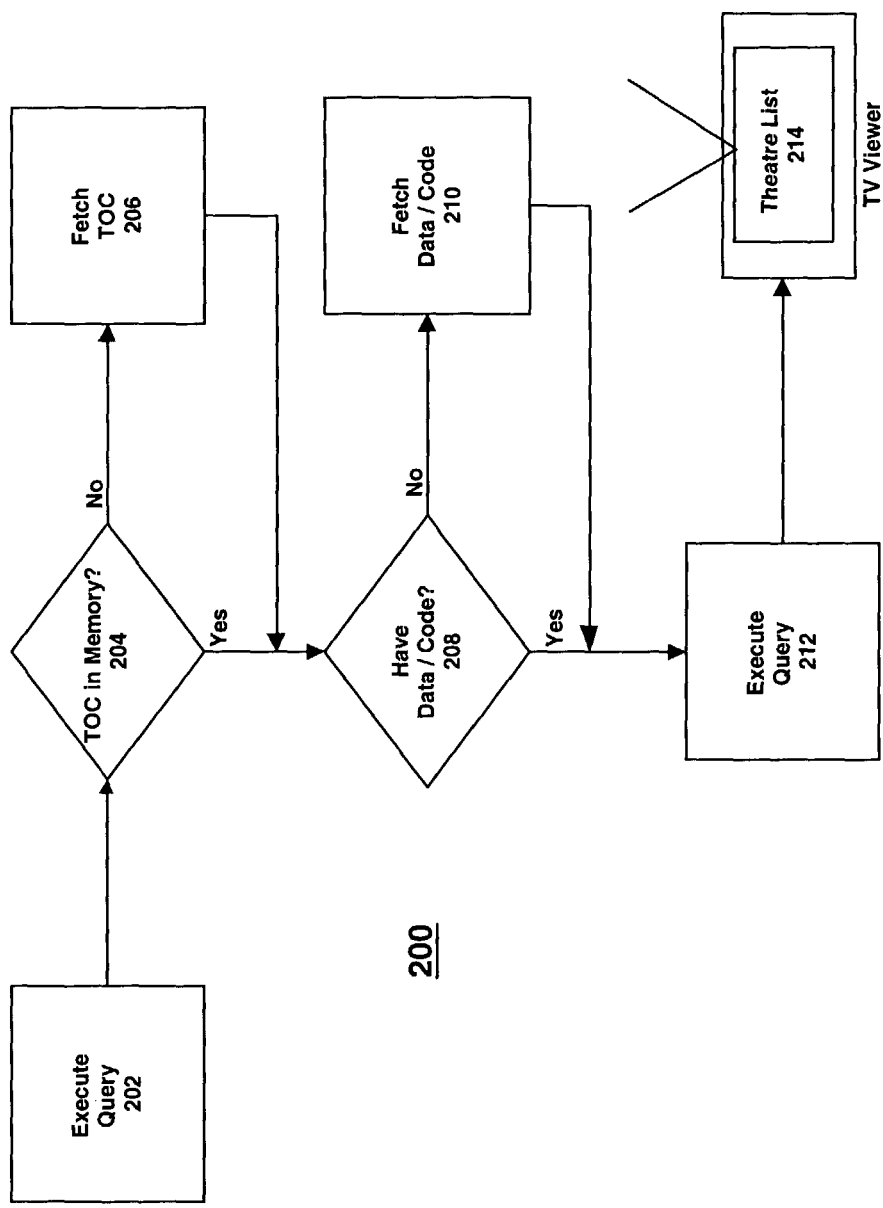
FIG. 2 illustrates a process for downloading data and code modules of a broadcast database at a set top box to resolve a query in accordance with an embodiment of the present invention.

FIG. 2 further illustrates the query process 200 used in interacting with the broadcast database. At step 202, a query is received via the query interface of the set top box. The query may come from a person viewing the television or it may come from another application executing at the set top box. In response to the query, the set top box checks to see whether the master table of contents module is resident in memory (step 204). It will often be the case that the table of contents module is downloaded and resident in the set top box before a query is received. However, in some cases this will not be true and the table of contents module will need to be downloaded upon receipt of a query at step 206.

The table of contents module is used by the set top box to obtain the table structure and sorting method definitions used in the data and code modules. These will vary depending upon the packaging method used by the broadcast center. As discussed further below, the goal of the packaging method is to ensure that for any given query, the master table of contents and all the data modules that are required to resolve a specific query will be able to be accommodated within the available set top box memory.

By way of example, suppose the query in question seeks a list of theatres in a certain city. The table structure definitions specified by the set top box may report the following:

Theater={ID, Name, Address, CityID}
Theatre_Table=a list of type Theatre
Theatre_Table_Size=the number of type Theatre in Theatre_Table These definitions indicate that a Theatre record includes several data items, specifically an identifier for the theatre (ID), the name of the theatre (Name), its street address (Address) and the city in which the theatre is located (CityID). This last data item could be reported in an encoded format which would require the use of a City table to decode (i.e., the CityID could simply be a number and the City table could provide a mapping between that number and the actual city name). These Theater records are all included in a table called Theatre_Table. That is, the Theatre_Table contains a list of theatres, with each theatre reported according to the record type Theatre. Finally, the Theatre_Table_Size definition reports the number of individual Theatre records in the Theatre_Table.

In addition to these data structure definitions, the table of contents also reports the definition of the sorting method used in the database. For example, the table of contents might report the following sorting method definition applicable to the theatre information:

Sort_By_City(Theatre_Table, City)

This indicates that if a query seeking the theatres in a given city is to be executed, a sort of the data contained in Theatre_Table according to the above definition is required. The sort may return a list according to the type Theatre_Table.

Originally we indicated that the query being posed sought a list of theatres for a given city. The query itself may have been input through a graphical user interface displayed on the television set using a remote control (or perhaps a wireless keyboard or similar device). The query interface in the set top box, however, will translate this human-readable request to a more structured query in the syntax of the broadcast database. For example, the query may be translated to:

SELECT*from Theatre_Table where CityID=5

In this example, the CityID "5" identifies the city for which the list of theatres is desired. This value may have been pulled from a lookup table at the set top box or it may have been returned in repose to an application query seeking the corresponding CityID number for a particular city name as input by the viewer.

Thus, with the query in place and the table of contents indicating the data tables and code modules necessary to execute the query, process 200 proceeds to step 208 to determine whether the needed data modules and code modules are already resident in the set top box's memory. If not, this information is downloaded from the broadcast carousel.

In the present example then, according to the table of contents the theatre information is going to be contained in the Theatre_Table, so if the corresponding data module(s) is/are not already resident in memory it/they will be downloaded. Likewise, the table of contents indicates that in order to perform a query for theatres in a certain city the Sort_By_City code module is needed. So, if this code module is not already resident n memory it will be downloaded from the carousel.

If new data and/or code modules are downloaded, the set top box query interface manages the local memory to ensure that sufficient space for these new items exists. This may involve deleting older data and/or code modules. Such memory management operations are well known in the art and are similar to those used by caches for other types of information.

Finally, at step 212, the query is executed. This is accomplished by the query interface dynamically linking the Sort_By_City code module and executing the computer-readable instructions contained therein to run the query over the data in the Theatr_Table. The results are returned in a list of type Theatre_Table, so that the Theatre records for theatres in the selected city (CityID=5) are displayed to the viewer (step 214).

Figure 3:
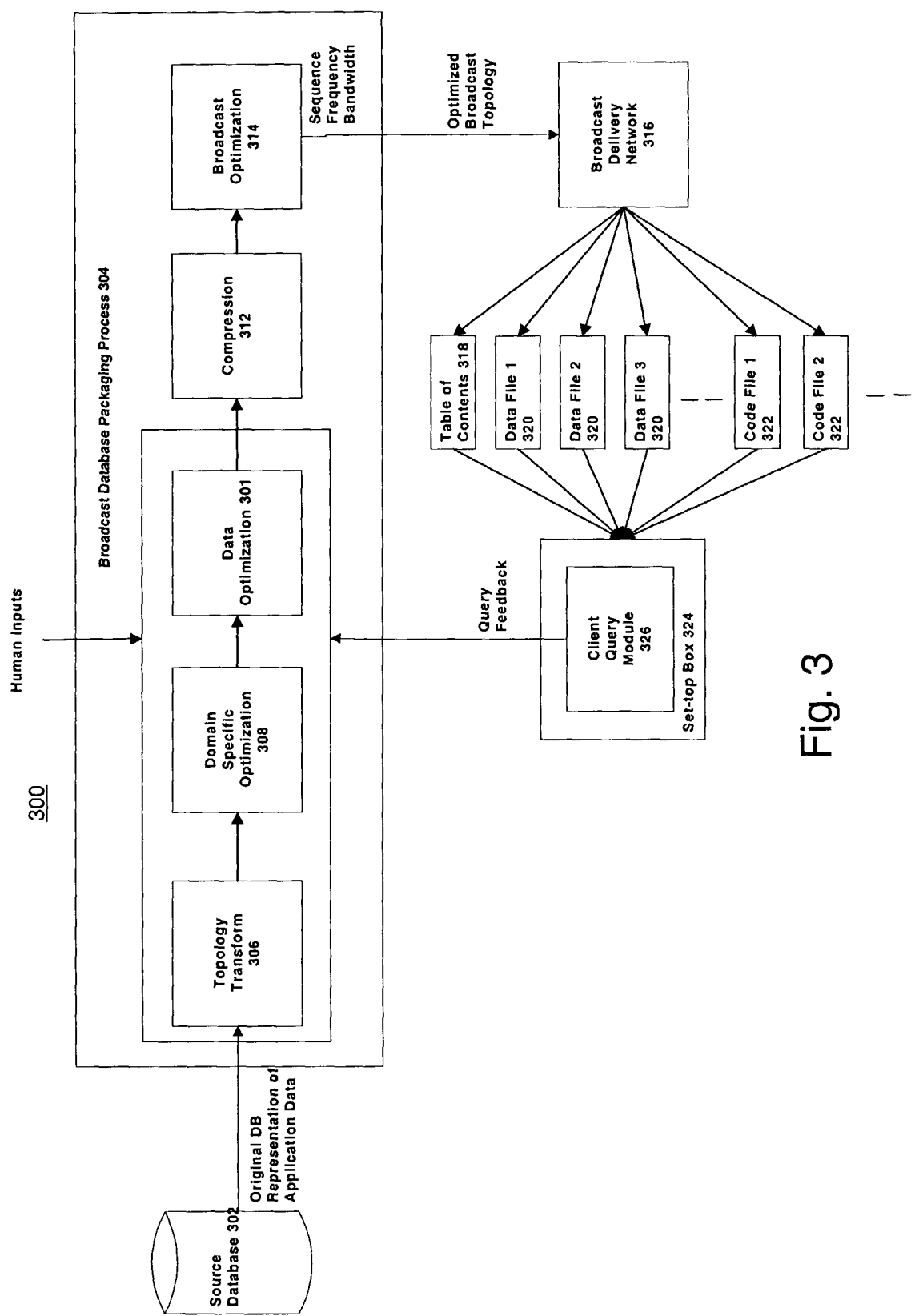
FIG. 3 illustrates aspects of a broadcast database packaging operation configured in accordance with an embodiment of the present invention.

Turning now to FIG. 3, further details of the packaging operations are illustrated. At the broadcast center 300, the original representation of the application data is provided from the source database 302 to the broadcast database packaging process 304. The first step in this process involves topology transformation 306 of the source database.

Using factors such as broadcast bandwidth, available client memory, and query speed (primary keys), the broadcast database packaging process 304 analyzes the source data to decide how to best to subdivide it into tables. This subdivision is referred to as a database topology has been determined, further algorithms decide how to split the resulting tables into data modules. A single data module may consist of one database table, multiple database tables, or a subdivision of one database table.

By the way of example, consider a scenario for broadcasting tables containing movie schedules and times data, with a set-top client requirement to query and display movies and times for a given theatre. There are two relevant tables that may be assembled from the data source:

a. Movie Schedule Table, which includes fields for theatre identifiers (TheatreID), movie identifiers (MovieID) and time identifiers (TimeID), which are show time groupings. An example of the Movie Schedule Table might be:

| Movie Schedule Table | | |
| --- | --- | --- |
| TheatreID | MovieID | TimeID |
| 1 | A | 1 |
| 2 | B | 2 |
| 3 | C | 1 |

The Movie Schedule table may be 100 Kbytes of data in total.

b. Times Table, which maps the TimeIDs to individual showing times. An example of the Times Table might be:

| Times Table | |
| --- | --- |
| TimeID | Show times |
| 1 | 9:00 pm, 10:00 pm, 11:00 pm, 12:00 am |
| 2 | 5:00 pm, 6:00 pm, 7:00 pm, 8:00 pm |

The Times Table may be 20 Kbytes of data in total.

Assume now that the target set-top box has an available 50 Kbytes of memory to execute a query seeking the movie schedules for a theatre. An example of such a query might be:

Select from MovieSchedule, Times
      Where TheatreId=<ID>
      And MovieSchedule.TimeId=Times.TimeId Based on knowledge of the client query requirements and available resources, the entire Times Table (20 Kbytes) can be carouseled to the set-top box as a single data module, while the Movie Schedule Table needs to be segmented so that the query can run in the available memory. In other words the Movie Schedule Table will be partitioned by primary search key TheatreId and packaged, for example, into approximately 20 Kbyte chunks, together with an index-mapping table (perhaps as part of the Table of Contents or as a separate data module) that provides a mapping between a TheatreId and its segment.

Once the topology operations have been completed, further domain specific optimizations 308 and data optimizations 310 may be performed. The present invention makes use of optimizations 308 that allow for the bandwidth reductions discussed above. For example, in some embodiments, the present invention allows for:

a. Analyzing database table fields to determine the most efficient storage type for that data. For example, phone numbers may be best represented as an integer or as a string.

b. Using common offset subtraction for numeric fields so that the maximum field value fits into the smallest number of bytes.

In addition to optimizing the storage options, the present invention also provides optimal data structures for such storage. In one embodiment, this is accomplished at process 310 by ordering the internal structure of the table fields to minimize the byte size of each record (e.g., using word alignment). This may be done automatically once a table database topology is established.

In each instance, the optimizations 308 and/or 310 are a response to human inputs regarding the various queries needed by the target applications at the set top box, as well as information regarding the available memory of those units. Such parameters change over time, for example as new client devices are deployed and/or as new information is retained in the original data store 302 and/or as new code modules (supporting new query types) are developed.

The present invention also allows for compression of an entire module after construction, to reduce broadcast size. Such compression is performed at process 312, and may include proprietary and/or conventional compression algorithms to provide bandwidth savings.

One the data optimizations and compression have been performed, broadcast optimizations 314 to address data sequencing and multiplexing may be undertaken. This aspect of the present invention allows for the intelligent sequencing and multiplexing of data into the broadcast stream such that the most frequently accessed data is most easily accessible and fastest to load. The present invention allows for predicting the types of queries that are currently being run or are likely to be run against the broadcast database and optimizing the sequence and frequency of popular data segments.

Figure 4A:
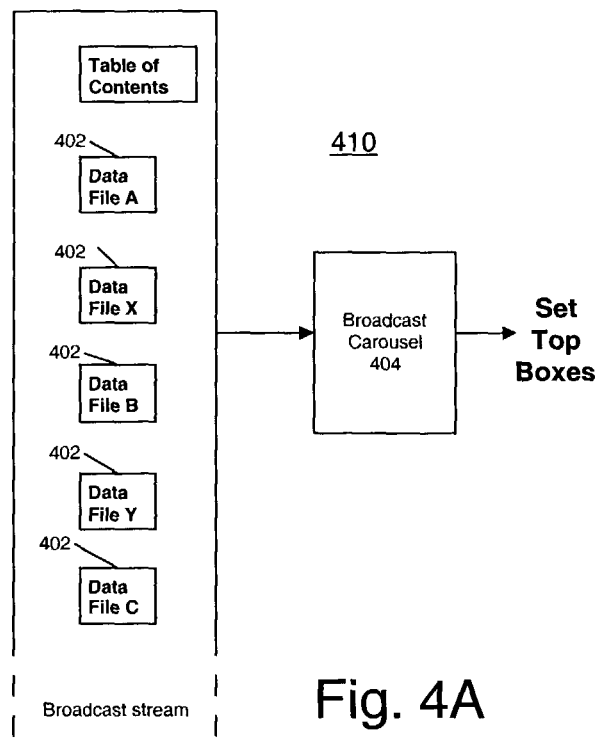
FIGS. 4A, 4B and 4C illustrate examples of broadcast optimization techniques for use in broadcasting modules of a broadcast database in accordance with an embodiment of the present invention.

Several different forms of broadcast optimization may be undertaken. For example, FIG. 4A illustrates an optimization process 410 used to decrease the latency of a query. Suppose data modules "A", "B" and "C" are required for a given query and data modules "X" and "Y" are needed for a different query. Typically, there is a minor processing delay at the set top box after a data module 402 has been acquired. This is necessary for memory storage operations, etc. So, when the first query is actually executed, the set top box acquires data module A, does some processing, acquires data module B, does some processing and then acquires data module C. Likewise, for the second query, the set top box will acquire data module X, perform some processing, then acquire data module Y and perform additional processing.

If data module B were transmitted immediately following data module A in the broadcast carousel 404, the set top box might miss data module B as it was processing data module A. Consequently, the set top box would have to wait for the entire carousel to repeat before it could acquire data module B, with all of the intervening time being wasted.

The broadcast optimization process 410 avoids this latency be inserting one or more data modules not required by the first query in the broadcast stream between data modules so required. In the illustrated example, data module X is inserted between data modules A and B and data module Y is inserted between data modules B and C. Thus, the data modules for particular queries are staggered within the broadcast stream (rather than being transmitted serially one after the other) so that the set top boxes are afforded time to complete the local processing operations as each data module for the query is downloaded.

Figure 4B:
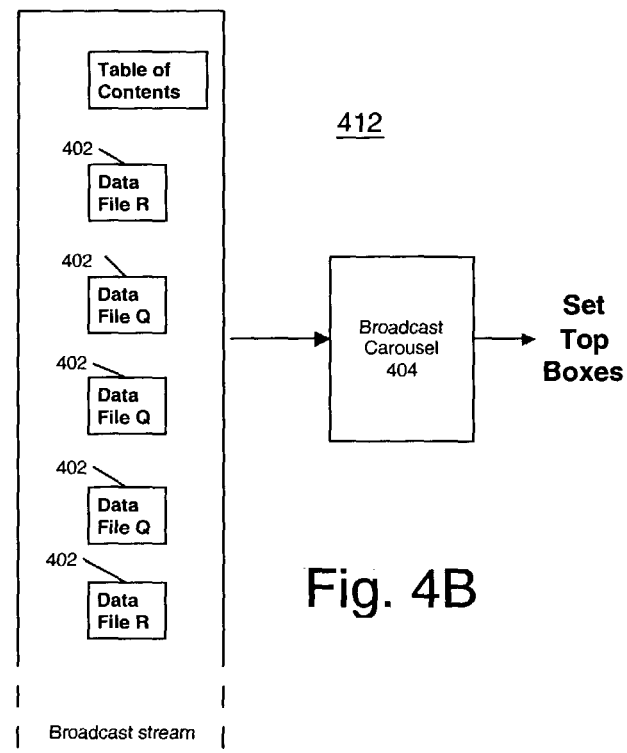

FIG. 4B illustrates a second broadcast optimization process 412 that may be used. In this example, any data modules needed for a high-speed query are broadcast more often as compared to other data modules transmitted using the same data carousel 404. Thus, in this example, data module Q (which is needed for a high-speed query) is broadcast multiple times and more often than data module R (which is not needed for the same high-speed query). This way, it is more likely that the set-top box needing data model Q will not have to wait long for that module in the broadcast stream.

Figure 4C:
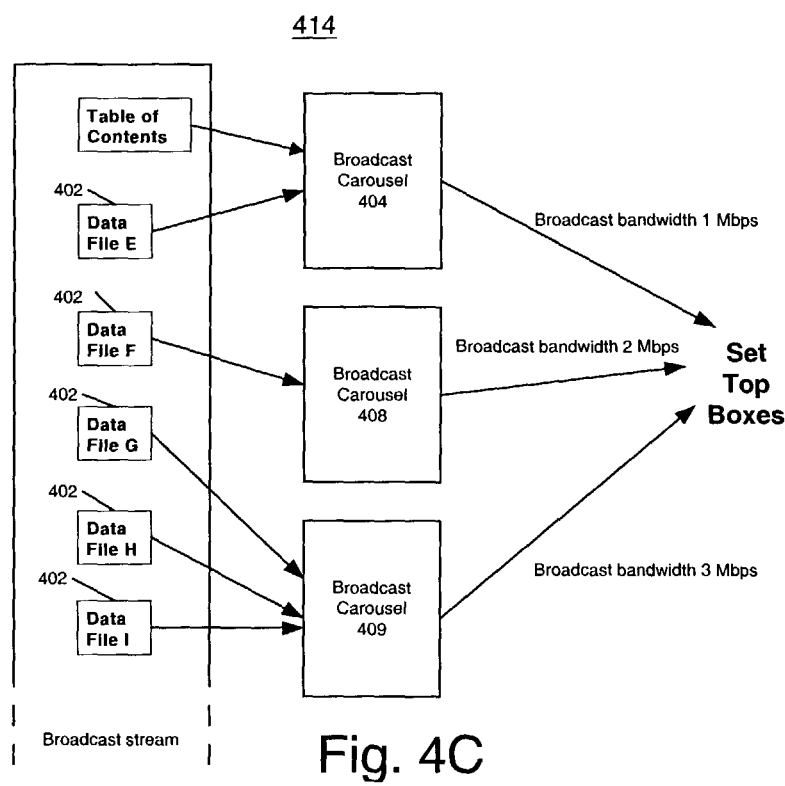

Yet another broadcast optimization process 414 is illustrated in FIG. 4C. In this example, multiple broadcast carousels 404, 408 and 409, perhaps each with different broadcast bandwidths, are used. The use of multiple broadcast carousels allows the data modules 402 to be divided up according to bandwidth needs, with more or larger modules being transmitted across high bandwidth broadcast carousels to adjust for network latencies. It should be noted that any or all of the broadcast optimization techniques might be used in combination with one another and/or with other optimization processes.

Returning to FIG. 3, following the broadcast optimization procedures 314, the optimized broadcast database modules are transmitted using the broadcast delivery network 316 of the service provider. For this broadcast phase, the subject database is a collection of modules or packages, which are organized (e.g., as database tables in C or another programming languages) resource structures that are compressed and transmitted. As indicated above, these broadcast packages are then repeated and inserted into a broadcast stream that is multiplexed and staggered in ways that optimize the accessibility of the most frequently accessed data. The frequency of accessed data may be predicted by analysis of past queries issued to the broadcast database. In addition, in some cases, the compressed data stream may be converted to another format, for example MPEG 2 transport streams, by conventional methods for transmission with other data streams.

The packaging process 304 creates 3 types of modules:

a. Table of Contents Module 318: This module contains information on the number, size, and contents of the data modules 320 and the methods that are contained in the code module 322. This module is the first module downloaded by the client 326 and describes the entire database broadcast structure. There is only one table of contents module 318 per each broadcast application. There can be more than one table of contents module in the broadcast stream, but only one will be seen per application depending on PID.

b. Data Table Modules 320: These modules contain data represented in table format. Each table is an array of a record type. The ID of the record is the index into the array. There can be an unlimited number of data modules 320, depending on necessary data and carousel size. Each module is a table to increase modularity of the module and to decrease the need to join tables together.

c. Code Modules 322: These modules contain the computer-based implementations for downloadable and dynamically linkable/executable methods. The code modules 322 are implemented algorithms ready for execution by the client 326. They are created in advance but dynamically downloaded on an as needed basis. The idea is that a specific query comes with a specific piece of code to execute the query, which can be downloaded and run by the client 326 without having to keep all these different queries on the set top box.324.

At the set-top box 324, the query interface 326 is responsible for the following operations:

a. Syntax for querying the database: The query interface 326 is resident at the set top box 324, or in some cases could be a downloaded application. In one embodiment, the query interface 326 uses a query syntax similar to SQL. Thus, the set top box 324 may issue a query via the query interface 326 such as: "SELECT*from Theatres where CityID=5". The query interface 326 parses this statement and determines which data modules 320 and code modules 322 are necessary to execute the query.

b. Downloading the required modules for the request: The query interface 326 then searches for the necessary modules in the set top box memory or, if not found, downloads them using the available memory. The query interface 326 also manages the caching of modules in memory until the memory is needed for other resources, bypassing the need to download a module already in memory. The query interface then links the data modules 320 and/or code modules 322 to the client in preparation for execution of the query.

c. Executing the query: Once the modules are in memory the query interface 326 executes the querying algorithms from the code modules 322 to retrieve the necessary data for the query.

In this way, the present broadcast database architecture enables content-rich applications in iTV systems and also allows for localization of nationally, or regionally broadcast applications.

Finally, information regarding the various queries executed at the set top boxes 324 may be provided as feedback (e.g., over a back channel) to the broadcast center 300. This information may cover such things as the types of queries being executed, the latency of the queries and other information. This information (together with business rules defined by human operators at the broadcast center 300) may be used to modify the packing up and broadcast processes. For example, based on the query feedback, the types of broadcast optimizations employed in transmitting the various modules may be changed. Alternatively, or in addition, the types of topology or other optimizations being used to package the database information may be modified to provide better usability.

Thus, a system and method for packaging, compressing, streaming, and/or querying a database via broadcast delivery has been described. In the foregoing description the present invention was illustrated by way of certain examples, but these examples should not be read as limiting the broader scope of the inventions which is more particularly described in the following claims.

What is claimed is:

1. A method comprising:
   receiving, by a first computing device and via a second computing device, an indication of a query to be executed at the second computing device;
   determining, by the first computing device and based on the query, a portion of content listings of a plurality of stored content listings, wherein the portion of content listings is to be processed by the second computing device based on execution of the query at the second computing device;
   generating, by the first computing device and based on the portion of the content listings and the indication of the query, a plurality of modules configured to facilitate execution of the query at the second computing device, wherein the plurality of modules comprises:
      one or more data modules that comprises an indication of the portion of the content listings, and
      a code module that facilitates execution of the query for determination of result data; and
   causing transmission, by the first computing device and to the second computing device, of the plurality of modules.

2. The method of claim 1, wherein generating the plurality of modules comprises:
   partitioning, based on an indication of an available resource associated with the second computing device, the portion of the content listings, wherein the indication of the portion of the content listings is based on the partitioning.

3. The method of claim 1, further comprising:
   determining a frequency of access associated with the one or more data modules;
   determining, based on the frequency of access, an order of transmission for the one or more data modules and one or more other data modules; and
   wherein causing transmission of the plurality of modules comprises causing transmission, based on the order of transmission, of the one or more data modules and the one or more other data modules.

4. The method of claim 1, wherein the one or more data modules organize the indication of the portion of the content listings based on a search key associated with the query.

5. The method of claim 1, wherein the plurality of modules comprises a contents module that comprises an indication that the one or more data modules and the code module facilitate execution of the query at the second computing device, and wherein causing transmission of the plurality of modules comprises causing transmission of the contents module;
   wherein the method further comprises receiving, from the second computing device and after causing transmission of the contents module, a request that indicates the code module and the one or more data modules; and
   wherein causing transmission of the plurality of modules comprises causing transmission, based on the request, of the code module and the one or more data modules.

6. The method of claim 1, wherein the one or more data modules comprises a first data module and a second data module, wherein causing transmission of the one or more data modules comprises causing transmission of the first data module and causing transmission of the second data module, and wherein the method further comprises:
   between causing transmission of the first data module and causing transmission of the second data module, causing transmission of a third data module that is not required for execution of the query at the second computing device.

7. The method of claim 1, wherein the plurality of stored content listings are stored based on a database table format, and wherein the one or more data modules are formatted to comprise the portion of the content listings in the database table format.

8. The method of claim 1, wherein the query is for an indication of content show times, wherein the portion of content listings comprises data that maps content to show times, and wherein the code module comprises executable code that, when executed, causes one or more of the show times to be retrieved from the portion of content listings.

9. The method of claim 1, wherein the code module comprises executable code that, when executed, causes the portion of content listings to be sorted based on execution of the query at the second computing device;
   wherein the plurality of modules comprises a contents module; and
   wherein the contents module comprises an indication that a sort of the portion of content listings is performed based on execution of the query at the second computing device.

10. The method of claim 1, wherein the plurality of stored content listings is stored as part of a relational database, an object oriented database, or an index sequence access method database, and wherein the one or more data modules are formatted to comprise the portion of the content listings in an original format of the relational database, the object oriented database, or the index sequence access method database.

11. The method of claim 1, wherein the one or more data modules partition the portion of the content listings into one or more data tables, wherein the one or more data tables organize, based on a search key associated with the query, the portion of the content listings.

12. The method of claim 1, wherein the second computing device comprises a user device.

13. The method of claim 1, wherein causing transmission comprises:
   causing transmission of at least a portion of the one or more data modules;
   causing transmission of at least a portion of one or more second data modules associated with a second query to be executed at a third computing device; and
   causing transmission, after transmission of the at least the portion of one or more second data modules, of the code module.

14. The method of claim 1, further comprising:
   selecting, based on a size of one or more of the code module or the one or more data modules, a carousel; and
   wherein causing transmission comprises causing transmission from the selected carousel.

15. An apparatus comprising:
   one or more processors; and
   memory storing executable instructions that, when executed by the one or more processors, cause the apparatus to:
      receive, via a computing device, an indication of a query to be executed at the computing device;
      determine, based on the query, a portion of content listings of a plurality of stored content listings, wherein the portion of content listings is to be processed by the computing device based on execution of the query at the computing device;
      generate, based on the portion of the content listings and the indication of the query, a plurality of modules configured to facilitate execution of the query at the computing device, wherein the plurality of modules comprises:
         one or more data modules that comprises an indication of the portion of the content listings, and
         a code module that facilitates execution of the query for determination of result data; and
      cause transmission, to the computing device, of the plurality of modules.

16. The apparatus of claim 15, wherein the query is for an indication of content show times, wherein the portion of content listings comprises data that maps content to show times, and wherein the code module comprises executable code that, when executed, causes one or more of the show times to be retrieved from the portion of content listings.

17. The apparatus of claim 15, wherein the code module comprises executable code that, when executed, causes the portion of content listings to be sorted based on execution of the query at the computing device;
   wherein the plurality of modules comprises a contents module; and
   wherein the contents module comprises an indication that a sort of the portion of content listings is performed based on execution of the query at the computing device.

18. The apparatus of claim 15, wherein the plurality of stored content listings is stored as part of a relational database, an object oriented database, or an index sequence access method database, and wherein the one or more data modules are formatted to comprise the portion of the content listings in an original format of the relational database, the object oriented database, or the index sequence access method database.

19. The apparatus of claim 15, wherein the executable instructions, when executed by the one or more processors, cause the apparatus to generate the plurality of modules by:
   partitioning, based on an indication of an available resource associated with the computing device, the portion of the content listings, wherein the indication of the portion of the content listings is based on the partitioning.

20. The apparatus of claim 15, wherein the executable instructions, when executed by the one or more processors, further cause the apparatus to:
   determine a frequency of access associated with the one or more data modules;
   determine, based on the frequency of access, an order of transmission for the one or more data modules and one or more other data modules; and
   wherein the executable instructions, when executed by the one or more processors, cause transmission of the plurality of modules by causing transmission, based on the order of transmission, of the one or more data modules and the one or more other data modules.

21. The apparatus of claim 15, wherein the one or more data modules organize the indication of the portion of the content listings based on a search key associated with the query.

22. The apparatus of claim 15, wherein the plurality of modules comprises a contents module that comprises an indication that the one or more data modules and the code module facilitate execution of the query at the computing device;
   wherein the executable instructions, when executed by the one or more processors, cause transmission of the plurality of modules by causing transmission of the contents module; and
   wherein the executable instructions, when executed by the one or more processors, further cause the apparatus to receive, from the computing device and after causing transmission of the contents module, a request that indicates the code module and the one or more data modules; and
   wherein the executable instructions, when executed by the one or more processors, further cause the apparatus to cause transmission of the plurality of modules by causing transmission, based on the request, of the code module and the one or more data modules.

23. The apparatus of claim 15, wherein the one or more data modules comprises a first data module and a second data module;
   wherein the executable instructions, when executed by the one or more processors, further cause the apparatus to cause transmission of the one or more data modules by causing transmission of the first data module and causing transmission of the second data module; and
   wherein the executable instructions, when executed by the one or more processors, further cause the apparatus to:
      between causing transmission of the first data module and causing transmission of the second data module, cause transmission of a third data module that is not required for execution of the query at the computing device.

24. The apparatus of claim 15, wherein the plurality of stored content listings are stored based on a database table format, and wherein the one or more data modules are formatted to comprise the portion of the content listings in the database table format.

25. The apparatus of claim 15, wherein the one or more data modules partition the portion of the content listings into one or more data tables, wherein the one or more data tables organize, based on a search key associated with the query, the portion of the content listings.

26. The apparatus of claim 15, wherein the computing device comprises a user device.

27. The apparatus of claim 15, wherein the executable instructions, when executed by the one or more processors, cause the apparatus to cause transmission of the plurality of modules by:
   causing transmission of at least a portion of the one or more data modules;
   causing transmission of at least a portion of one or more second data modules associated with a second query to be executed at a third computing device; and
   causing transmission, after transmission of the at least the portion of one or more second data modules, of the code module.

28. The apparatus of claim 15, wherein the executable instructions, when executed by the one or more processors, further cause the apparatus to:
   select, based on a size of one or more of the code module or the one or more data modules, a carousel; and
   wherein the executable instructions, when executed by the one or more processors, cause transmission of the plurality of modules by causing transmission from the selected carousel.

29. A system comprising:
   a first computing device; and
   a second computing device;
   wherein the first computing devices comprises:
      one or more first processors; and
      first memory storing first executable instructions that, when executed by the one or more first processors, cause the first computing device to:
         receive, via the second computing device, an indication of a query to be executed at the second computing device;
         determine, based on the query, a portion of content listings of a plurality of stored content listings, wherein the portion of content listings is to be processed by the second computing device based on execution of the query at the second computing device;
         generate, based on the portion of the content listings and the indication of the query, a plurality of modules configured to facilitate execution of the query at the second computing device, wherein the plurality of modules comprises:
            one or more data modules that comprises an indication of the portion of the content listings, and
            a code module that facilitates execution of the query for determination of result data; and
         cause transmission, to the second computing device, of the plurality of modules; and
   wherein the second computing device comprises:
      one or more second processors; and
      second memory storing second executable instructions that, when executed by the one or more second processors, cause the second computing device to:
         receive the plurality of modules; and
         execute, based on the plurality of modules, the query.

30. The system of claim 29, wherein the query is for an indication of content show times, wherein the portion of content listings comprises data that maps content to show times, and wherein the code module comprises executable code that, when executed, causes one or more of the show times to be retrieved from the portion of content listings.

31. The system of claim 29, wherein the code module comprises executable code that, when executed, causes the portion of content listings to be sorted based on execution of the query at the second computing device;
   wherein the plurality of modules comprises a contents module; and
   wherein the contents module comprises an indication that a sort of the portion of content listings is performed based on execution of the query at the second computing device.

32. The system of claim 29, wherein the plurality of stored content listings is stored as part of a relational database, an object oriented database, or an index sequence access method database, and wherein the one or more data modules are formatted to comprise the portion of the content listings in an original format of the relational database, the object oriented database, or the index sequence access method database.

33. The system of claim 29, wherein the first executable instructions, when executed by the one or more first processors, cause the first computing device to generate the plurality of modules by:
   partitioning, based on an indication of an available resource associated with the second computing device, the portion of the content listings, wherein the indication of the portion of the content listings is based on the partitioning.

34. The system of claim 29, wherein the first executable instructions, when executed by the one or more first processors, further cause the first computing device to:
   determine a frequency of access associated with the one or more data modules;
   determine, based on the frequency of access, an order of transmission for the one or more data modules and one or more other data modules; and
   wherein the first executable instructions, when executed by the one or more first processors, cause transmission of the plurality of modules by causing transmission, based on the order of transmission, of the one or more data modules and the one or more other data modules.

35. The system of claim 29, wherein the one or more data modules organize the indication of the portion of the content listings based on a search key associated with the query.

36. The system of claim 29, wherein the plurality of modules comprises a contents module that comprises an indication that the one or more data modules and the code module facilitate execution of the query at the second computing device;
   wherein the first executable instructions, when executed by the one or more first processors, cause transmission of the plurality of modules by causing transmission of the contents module;
   wherein the first executable instructions, when executed by the one or more first processors, further cause the first computing device to receive, from the second computing device and after causing transmission of the contents module, a request that indicates the code module and the one or more data modules; and
   wherein the first executable instructions, when executed by the one or more first processors, further cause the first computing device to cause transmission of the plurality of modules by causing transmission, based on the request, of the code module and the one or more data modules.

37. The system of claim 29, wherein the one or more data modules comprises a first data module and a second data module;

wherein the first executable instructions, when executed by the one or more first processors, further cause the first computing device to cause transmission of the one or more data modules by causing transmission of the first data module and causing transmission of the second data module; and wherein the first executable instructions, when executed by the one or more first processors, further cause the first computing device to:

between causing transmission of the first data module and causing transmission of the second data module, cause transmission of a third data module that is not required for execution of the query at the second computing device.

38. The system of claim 29, wherein the plurality of stored content listings are stored based on a database table format, and wherein the one or more data modules are formatted to comprise the portion of the content listings in the database table format.

39. The system of claim 29, wherein the one or more data modules partition the portion of the content listings into one or more data tables, wherein the one or more data tables organize, based on a search key associated with the query, the portion of the content listings.

40. The system of claim 29, wherein the second computing device comprises a user device.

41. The system of claim 29, wherein the first executable instructions, when executed by the one or more first processors, cause the first computing device to cause transmission of the plurality of modules by:

causing transmission of at least a portion of the one or more data modules;

causing transmission of at least a portion of one or more second data modules associated with a second query to be executed at a third computing device; and causing transmission, after transmission of the at least the portion of one or more second data modules, of the code module.

42. The system of claim 29, wherein the first executable instructions, when executed by the one or more first processors, further cause the first computing device to:

select, based on a size of one or more of the code module or the one or more data modules, a carousel; and wherein the first executable instructions, when executed by the one or more first processors, cause transmission of the plurality of modules by causing transmission from the selected carousel.

43. A non-transitory computer-readable medium storing instructions which, when executed, cause:

receiving, by a first computing device and via a second computing device, an indication of a query to be executed at the second computing device;

determining, by the first computing device and based on the query, a portion of content listings of a plurality of stored content listings, wherein the portion of content listings is to be processed by the second computing device based on execution of the query at the second computing device;

generating, by the first computing device and based on the portion of the content listings and the indication of the query, a plurality of modules configured to facilitate execution of the query at the second computing device, wherein the plurality of modules comprises:

one or more data modules that comprises an indication of the portion of the content listings, and a code module that facilitates execution of the query for determination of result data; and causing transmission, by the first computing device and to the second computing device, of the plurality of modules.

44. The non-transitory computer-readable medium of claim 43, wherein the instructions, when executed, cause generating the plurality of modules by causing:

partitioning, based on an indication of an available resource associated with the second computing device, the portion of the content listings, wherein the indication of the portion of the content listings is based on the partitioning.

45. The non-transitory computer-readable medium of claim 43, wherein the instructions, when executed, further cause:

determining a frequency of access associated with the one or more data modules;

determining, based on the frequency of access, an order of transmission for the one or more data modules and one or more other data modules; and wherein the instructions, when executed, cause the transmission of the plurality of modules by causing transmission, based on the order of transmission, of the one or more data modules and the one or more other data modules.

46. The non-transitory computer-readable medium of claim 43, wherein the one or more data modules organize the indication of the portion of the content listings based on a search key associated with the query.

47. The non-transitory computer-readable medium of claim 43, wherein the plurality of modules comprises a contents module that comprises an indication that the one or more data modules and the code module facilitate execution of the query at the second computing device;

wherein the instructions, when executed, cause the transmission of the plurality of modules by causing transmission of the contents module; and wherein the instructions, when executed, further cause receiving, from the second computing device and after causing transmission of the contents module, a request that indicates the code module and the one or more data modules; and wherein the instructions, when executed, further cause the transmission of the plurality of modules by causing transmission, based on the request, of the code module and the one or more data modules.

48. The non-transitory computer-readable medium of claim 43, wherein the one or more data modules comprises a first data module and a second data module;

wherein the instructions, when executed, further cause the transmission of the one or more data modules by causing transmission of the first data module and causing transmission of the second data module; and wherein the instructions, when executed, further cause:

between causing transmission of the first data module and causing transmission of the second data module, cause transmission of a third data module that is not required for execution of the query at the second computing device.

49. The non-transitory computer-readable medium of claim 43, wherein the plurality of stored content listings are stored based on a database table format, and wherein the one or more data modules are formatted to comprise the portion of the content listings in the database table format.

50. The non-transitory computer-readable medium of claim 43, wherein the query is for an indication of content show times, wherein the portion of content listings comprises data that maps content to show times, and wherein the code module comprises executable code that, when executed, causes one or more of the show times to be retrieved from the portion of content listings.

51. The non-transitory computer-readable medium of claim 43, wherein the code module comprises executable code that, when executed, causes the portion of content listings to be sorted based on execution of the query at the second computing device;

wherein the plurality of modules comprises a contents module; and wherein the contents module comprises an indication that a sort of the portion of content listings is performed based on execution of the query at the second computing device.

52. The non-transitory computer-readable medium of claim 43, wherein the plurality of stored content listings is stored as part of a relational database, an object oriented database, or an index sequence access method database, and wherein the one or more data modules are formatted to comprise the portion of the content listings in an original format of the relational database, the object oriented database, or the index sequence access method database.

53. The non-transitory computer-readable medium of claim 43, wherein the one or more data modules partition the portion of the content listings into one or more data tables, wherein the one or more data tables organize, based on a search key associated with the query, the portion of the content listings.

54. The non-transitory computer-readable medium of claim 43, wherein the second computing device comprises a user device.

55. The non-transitory computer-readable medium of claim 43, wherein the instructions, when executed, cause causing transmission of the plurality of modules by:

causing transmission of at least a portion of the one or more data modules;

causing transmission of at least a portion of one or more second data modules associated with a second query to be executed at a third computing device; and causing transmission, after transmission of the at least the portion of one or more second data modules, of the code module.

56. The non-transitory computer-readable medium of claim 43, wherein the instructions, when executed, further cause:

selecting, based on a size of one or more of the code module or the one or more data modules, a carousel; and wherein the instructions, when executed, cause transmission of the plurality of modules by causing transmission from the selected carousel.

* * * * *

UNITED STATES PATENT AND TRADEMARK OFFICE
CERTIFICATE OF CORRECTION

| | | |
|---|---|---|
| PATENT NO. | : 11,388,451 B2 | Page 1 of 1 |
| APPLICATION NO. | : 10/306752 | |
| DATED | : July 12, 2022 | |
| INVENTOR(S) | : Chane et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1639 days.

In the Drawings

Sheet 3 of 5, Fig. 3, Reference Numeral 301, Line 2:
Please delete "301" and insert --310--

In the Specification

Background, Column 4, Line 1:
Delete "modem" and insert --modern--

Detailed Description, Column 9, Line 37:
Delete "Theatr_Table." and insert --Theatre_Table.--

Detailed Description, Column 9, Line 52:
Delete "topology" and insert --topology. Once a topology--

Detailed Description, Column 9, Line 58:
After "By", delete "the"

Detailed Description, Column 12, Line 50:
Delete "box.324." and insert --box 324.--

Signed and Sealed this
Fifth Day of September, 2023

Katherine Kelly Vidal
*Director of the United States Patent and Trademark Office*